July 4, 1933.  I. SIKORSKY  1,916,444
MULTIMOTORED AMPHIBIAN
Filed Aug. 2, 1929  8 Sheets-Sheet 1
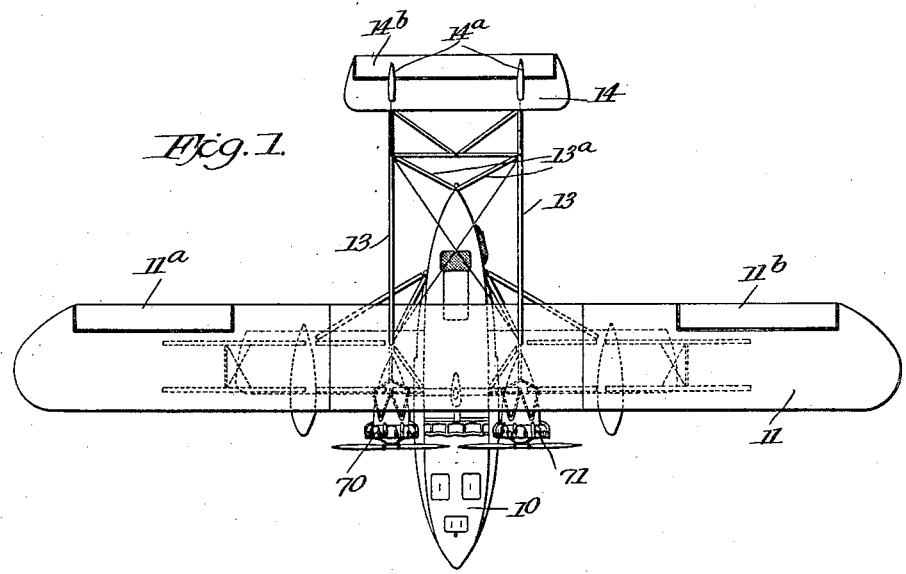
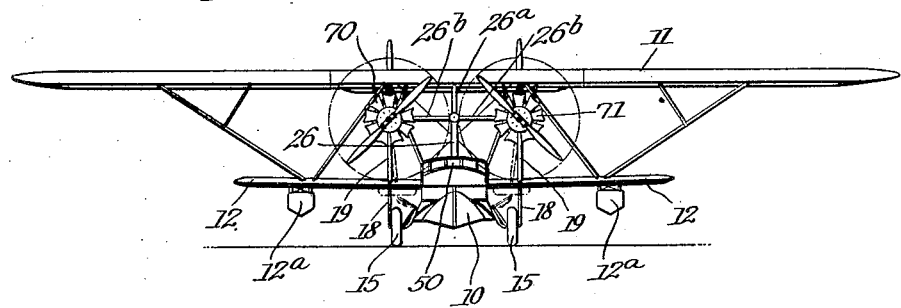
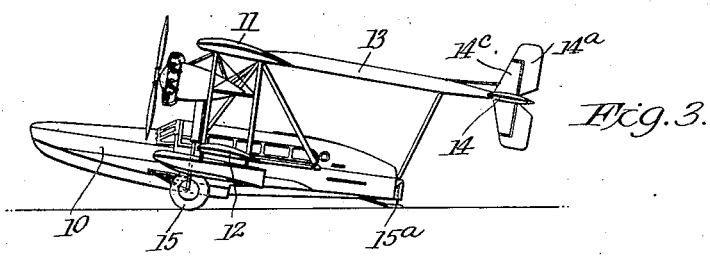
Igor Sikorsky
INVENTOR
BY
ATTORNEY

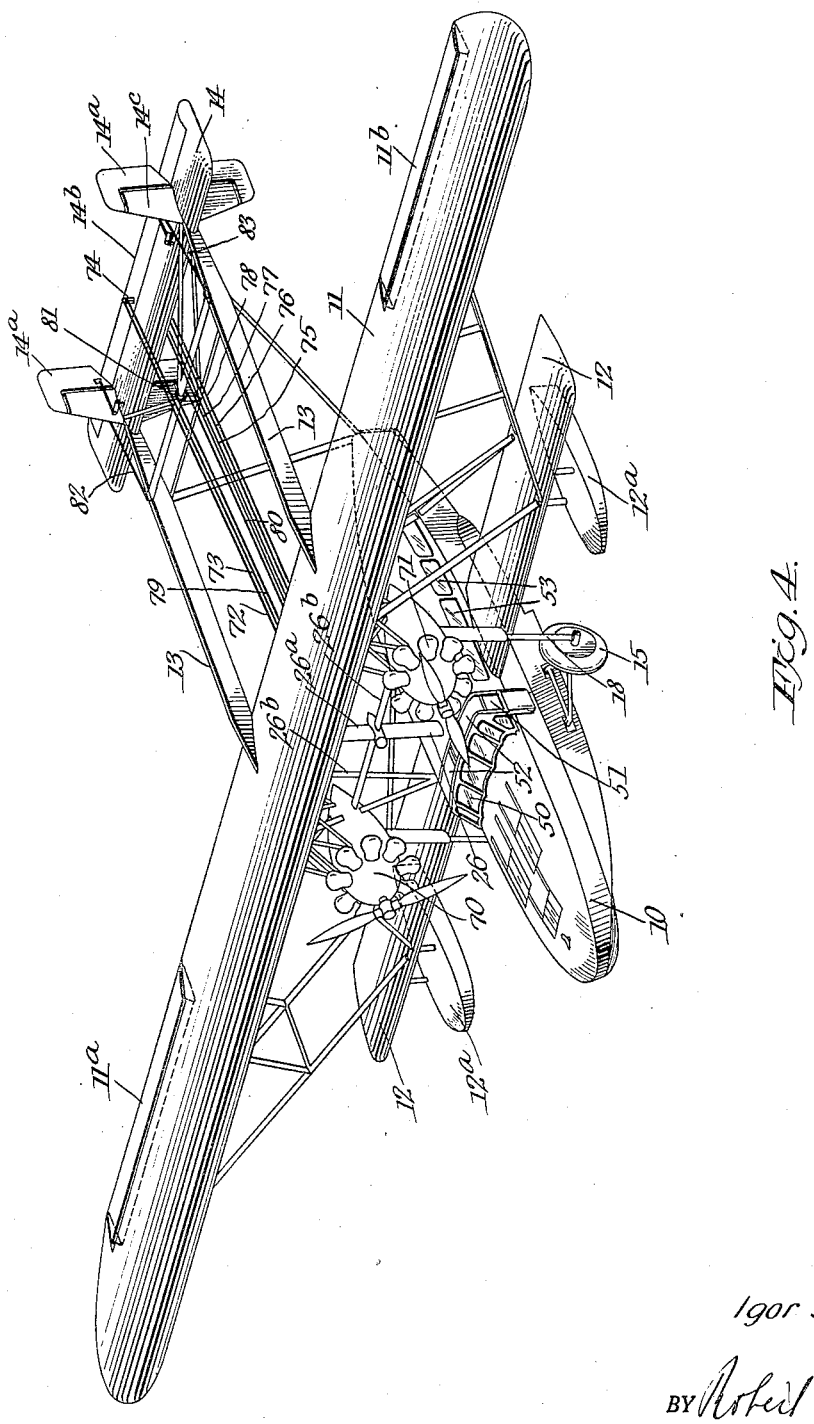

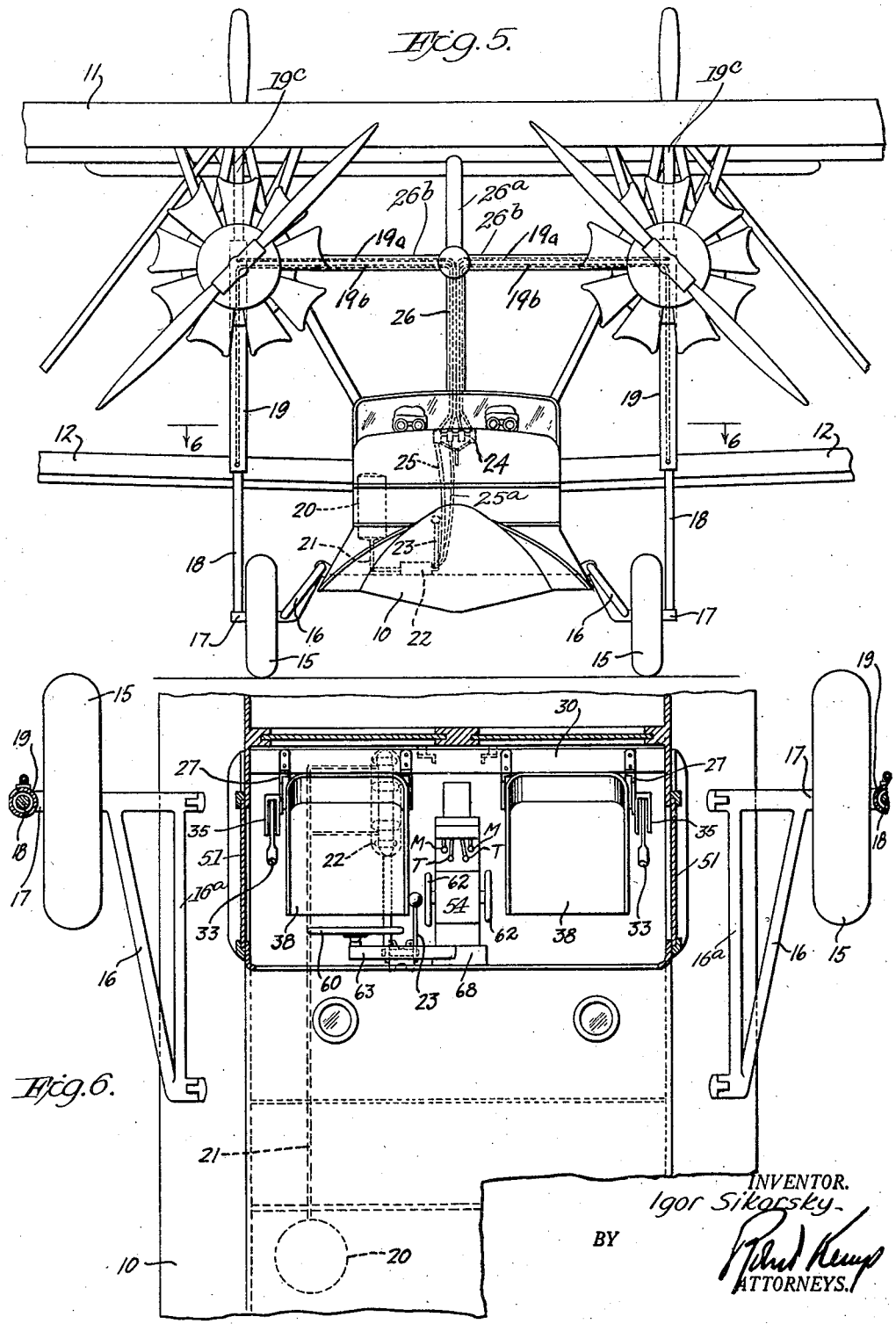

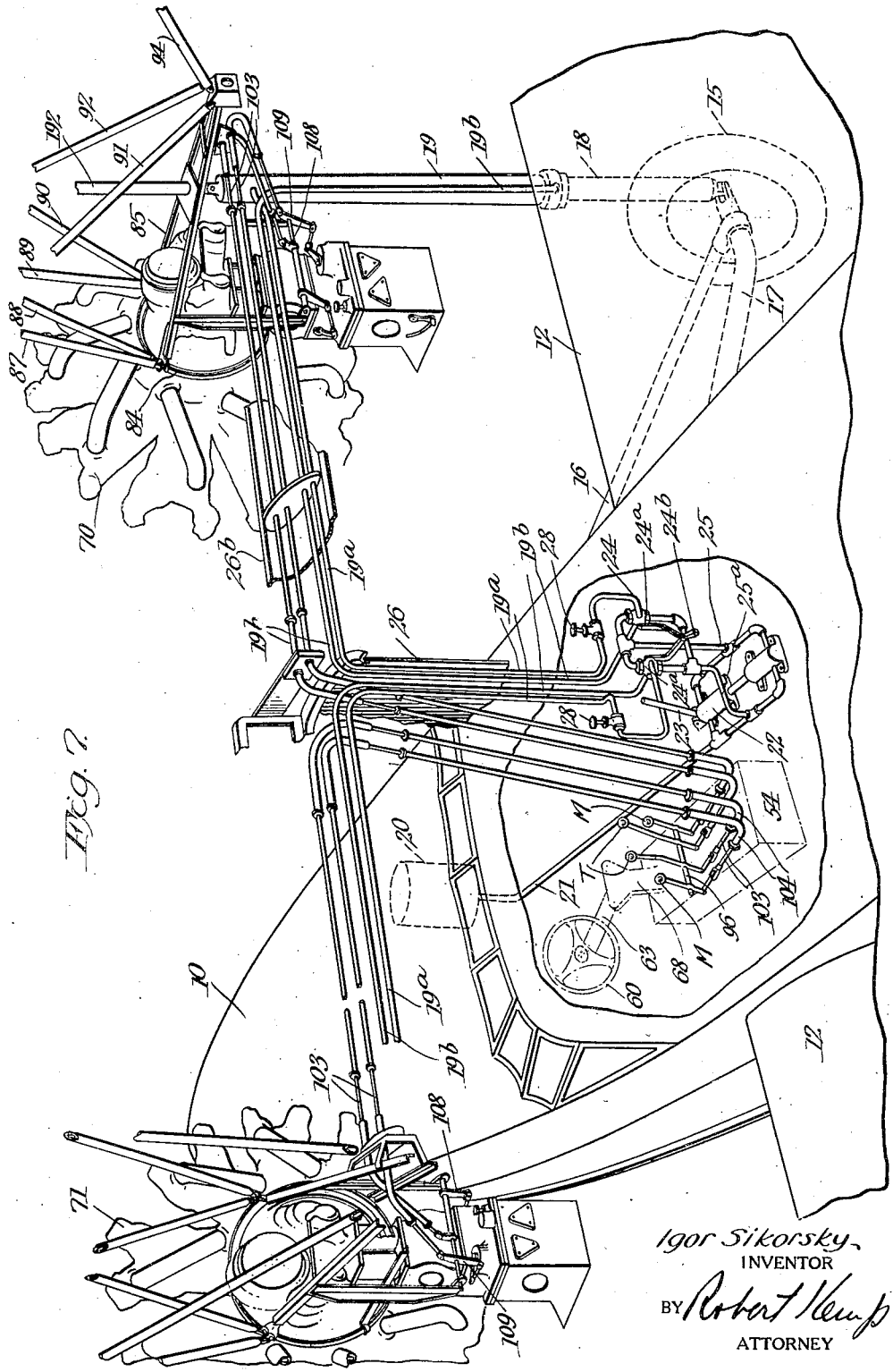

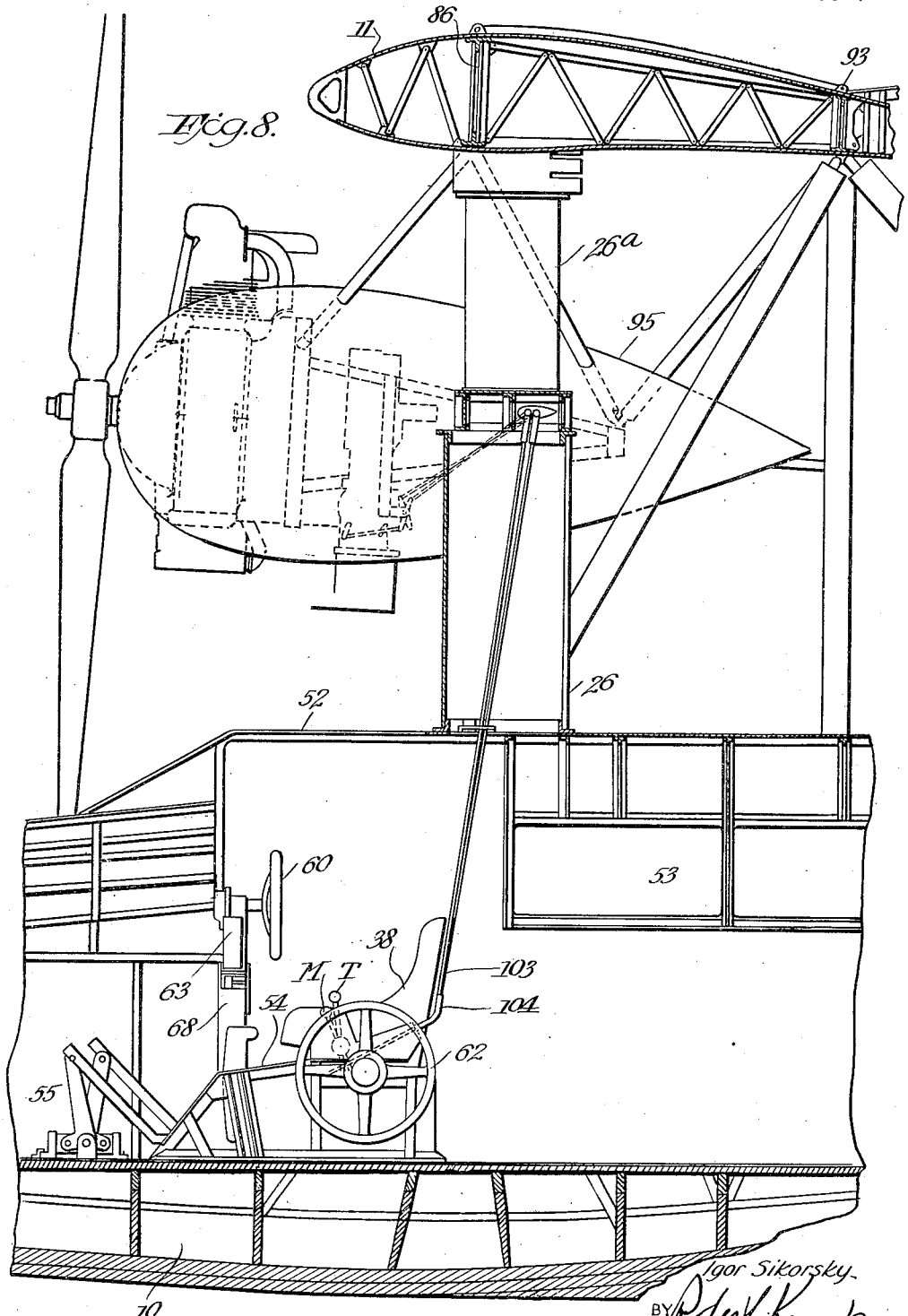

July 4, 1933.   I. SIKORSKY   1,916,444
MULTIMOTORED AMPHIBIAN
Filed Aug. 2, 1929   8 Sheets-Sheet 6
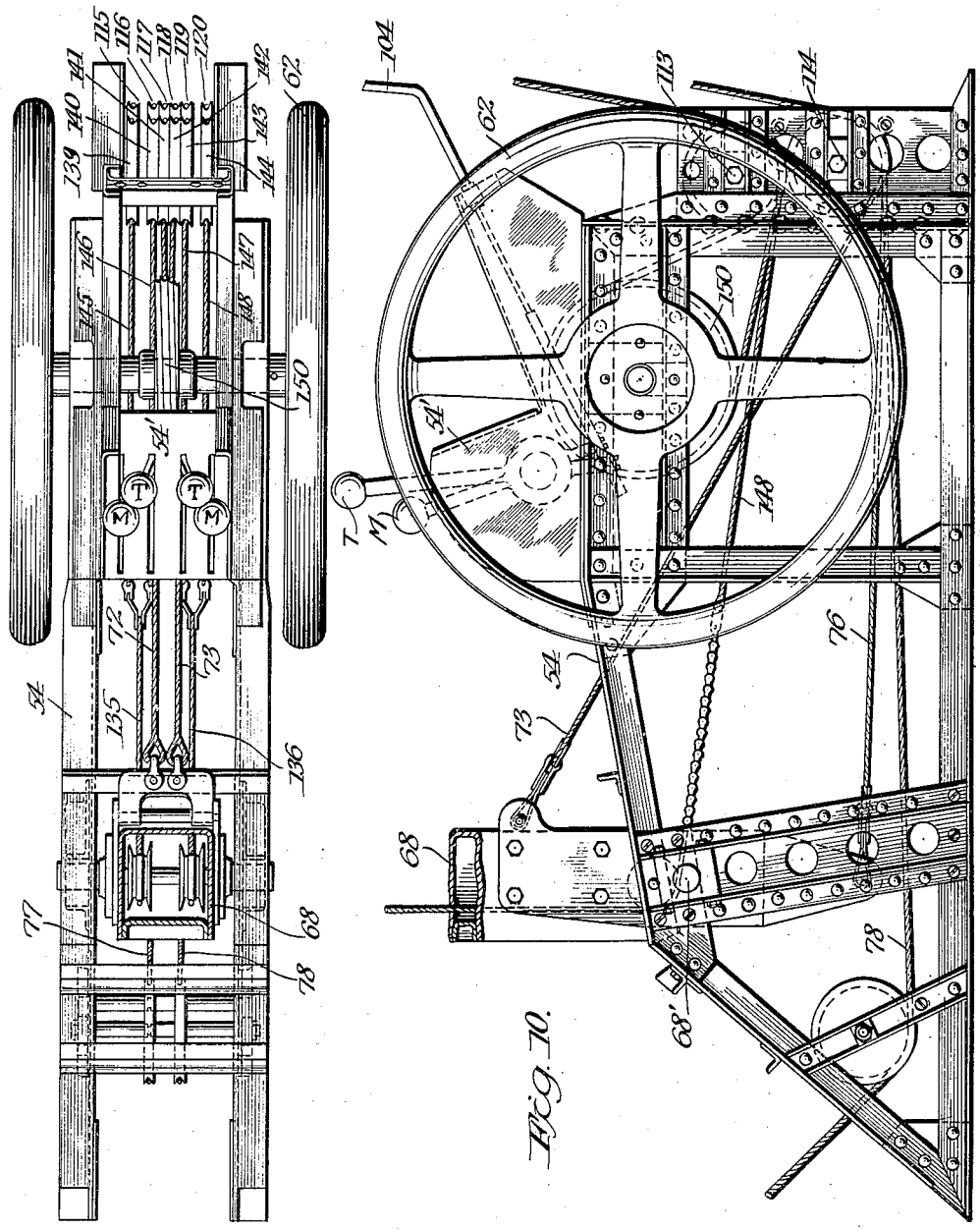
Igor Sikorsky
INVENTOR
BY Robert Kemp
ATTORNEY

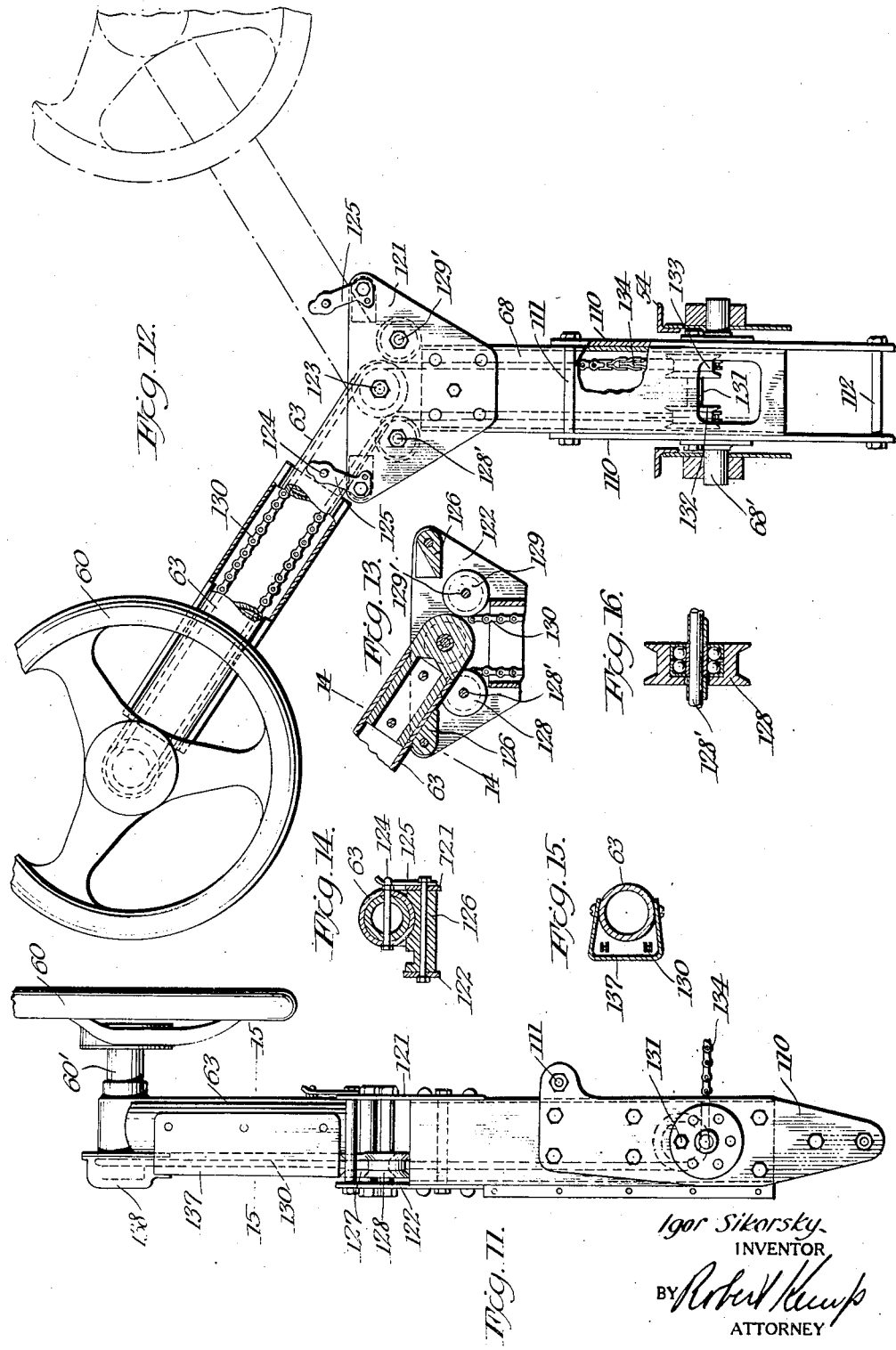

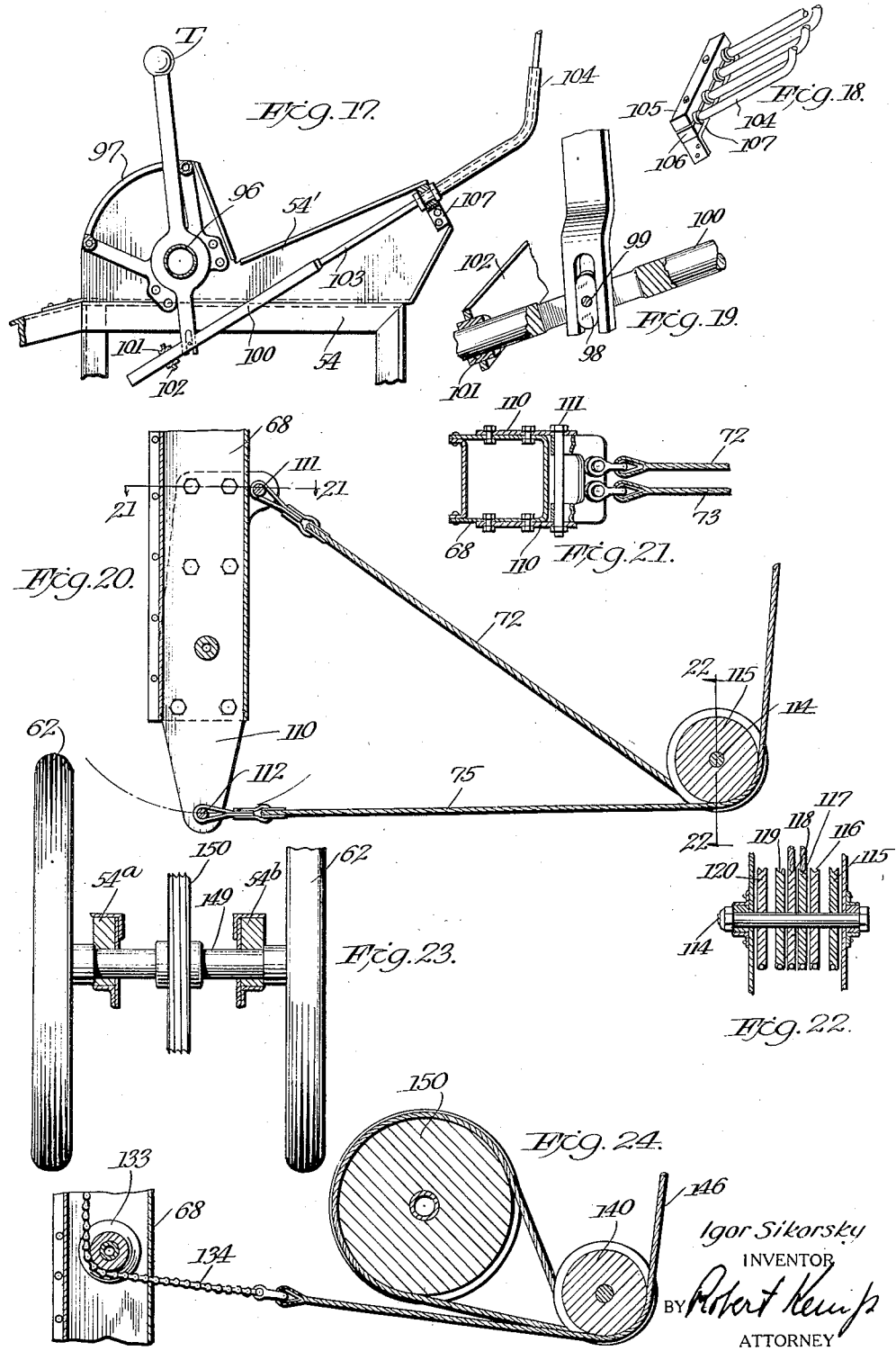

Patented July 4, 1933

1,916,444

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

MULTIMOTORED AMPHIBIAN

Application filed August 2, 1929. Serial No. 382,980.

The present invention relates to aircraft of the land-water-air type commonly known as amphibians. In its broadest aspect the invention relates to such an aircraft having a plurality of driving motors, preferably of the traction type.

While a plurality of motors have been employed in aeroplanes and hydroaeroplanes, the amphibian machine has come to be recognized as a separate and distinct type, and in the adaption of such a machine to a plurality of motors I have made a distinctly new step in the art.

While I do not limit myself to the number of motors employed, according to the embodiment of the invention as hereinafter set forth, two motors are mounted somewhat in advance of the main plane of the amphibian in symmetrical relation to the horizontal axis of the latter, a body boat being likewise symmetrically arranged to such axis and disposed below the motors.

Retractible landing wheels are provided, these being disposed with portions projecting forward of the lower planes in all positions of adjustment.

Within the body boat and extending forward of the main wing is a pilot's compartment provided with top and side windows so that the operation of the motors and the position of the landing wheels may be fully observed at all times.

The pilot's compartment is preferably provided with two seats arranged side by side, and all of the machine controls are localized so as to be operable by a pilot in either seat. Thus either pilot may separately control both of the motors, raise or lower the landing wheels singly or simultaneously, control the horizontal and vertical control members, and adjust the angle of incidence of the stabilizer, all without moving from his seat.

The particular improvements contemplated by the present invention will become apparent from the following description in which reference is had to the accompanying drawings, in which:

Figure 1 is a plan view of an amphibian embodying the present invention.

Figure 2 is a front elevation of the amphibian.

Figure 3 is a side elevation of the amphibian.

Figure 4 is an isometric perspective of the amphibian.

Figure 5 is an enlarged front elevation of the central portion of the amphibian.

Figure 6 is a section on line 6—6 of Figure 5.

Figure 7 is a perspective showing in part the body-boat and engines of the amphibian, a landing wheel, and the control mechanisms for the motors and landing wheels.

Figure 8 is an enlarged side elevation of a portion of the body-boat, parts being shown in section and parts broken away.

Figure 9 is a plan view of certain control means and their mounting frame.

Figure 10 is a side elevation of the elements shown in Figure 9.

Figure 11 is a side elevation of a control post and wheel.

Figure 12 is a front elevation of the control post and wheel.

Figure 13 is a transverse section through the upper portion of the control post and the adjacent portion of a swinging arm secured thereto.

Figure 14 is a section on line 14—14 of Figure 13.

Figure 15 is a section on line 15—15 of Figure 11.

Figure 16 is a diametrical section of a guide roller for the aileron control cable.

Figure 17 is a section showing an engine control and its associated push and pull rod.

Figures 18 and 19 are details in perspective.

Figure 20 is a vertical section through the lower portion of the control post and an associated guide sheave.

Figure 21 is a section on line 21—21 of Figure 20.

Figure 22 is a section on line 22—22 of Figure 20.

Figure 23 is a plan view of control members for the stabilizer, and

Figure 24 is a vertical section through a portion of the control post, a guide sheave and drum, the latter forming a part of the showing of Figure 23.

Referring to the drawings, reference numeral 10 indicates a body-boat disposed below a main plane 11, lower wings 12 extending laterally of the body-boat beneath the main plane and being connected with the latter by means of suitable interplane struts. Pontoons 12a are suspended beneath the outer ends of wings 12. A pair of motors 70 and 71 are suspended beneath the main plane, one at each side of the vertical axial plane of the body-boat 10. Rearwardly of main plane 11 and in alignment with the axes of motors 70 and 71 project outriggers 13, which at their rear ends support an empennage comprising the stabilizer 14, rudders 14a, elevator 14b and vertical fins as shown at 14c, Figure 3. The rear portions of outriggers 13 are connected to the stern of the body-boat by means of struts 13a.

To adapt the machine for landing on ground, it is provided with landing wheels 15 and a tail skid 15a. The landing wheels, by means of mechanism to be described, may be swung from their operative position shown in full lines in Figure 2 to the inoperative position indicated in dotted lines.

Referring to Figures 2, 4 and 5, it will be noted that a streamline conduit 26 projects upwardly from the body-boat, this conduit having lateral branches 26b running to the rear of the motors, and an upward extension 26a terminating at the lower surface of main plane 11. Through this conduit are passed all of the controls for the motors, the retractible landing gear, the vertical and horizontal movable control members, and the stabilizer adjusting means. In Figure 4, cables 72 and 73 run to a rigid post 74 projecting from the upper surface of the elevator, while cables 75 and 76 run to the lower end of this post which projects below the lower surface of the elevator. Cables 77 and 78 run to a horizontal normally transversely extending cross arm by means of which the rudders are controlled, while reference numerals 79 and 80 represent sections of a cable having an interposed chain section engaging a sprocket 81 which controls push and pull rods, which through suitable bell crank levers are adapted to reciprocate links 82 and 83 to adjust the angle of incidence of the stabilizer 14, this latter being pivoted to the ends of the outriggers and supporting all the other empennage members. The described cables all pass through conduits 26 and 26a, as do likewise the control cables for ailerons 11a and 11b, these latter control cables, however, being concealed within wing 11.

The wheel retracting and projecting mechanism has been particularly illustrated in Figures 5 to 7. Landing wheels 15 are mounted on axles 17 pivoted to the body-boat for oscillation about normally substantially horizontal axes parallel to the longitudinal axis of the body-boat, the axles being braced by means of members 16 and 16a. To the outer ends of axles 17 are pivoted rods 18 provided at their upper ends with piston heads guided in tubular members or cylinders 19. Cylinders 19 are pivoted at their upper ends to rigid members 19c so that the cylinders are adapted to swing in a plane transverse to the body-boat. By introducing fluid under pressure into cylinders 19 at one side or the other of the piston heads, rods 18 may be retracted or projected.

A tank containing a suitable hydraulic fluid such as oil, glycerine or the like is indicated at 20. This tank is connected by means of a line 21 with a pressure generator or pump 22 adapted to be operated by means of a pivoted lever 23. The pump delivers fluid under pressure to a distributor 24 through a tube 25, a return to line 21 being provided through a connection 25a. By suitable manipulation of distributor 24, the fluid under pressure may be diverted to the upper ends of cylinders 19 singly or simultaneously through tubes 19a or to the lower ends of the cylinder, either singly or simultaneously, through tubes 19b.

The distributor 24, see Figures 7 and 8, comprises two four-way valves 24a each provided with an operating handle 24b, these handles extending within close proximity so that they may be grasped singly or simultaneously and manipulated with one hand. By suitable manipulation of the handles, the pressure fluid may be sent through tubes 19a to project rods 18, or through tubes 19b to retract rods 18. When the rods are in their projected position, the fluid may be locked therein by means of globe valves 28, and the fluid thus locked in the upper ends of cylinders 19 serves as a cushioning medium.

In the pilot's compartment two seats 38 are arranged side by side and are vertically adjustable along uprights 27 by means of levers 33 which cooperate with locking segments 35.

The pilot's compartment extends somewhat forward of main wing 11 and is provided with a front window or windows 50, side windows 51 and top windows 52. As has been mentioned, the motors are situated somewhat in advance of main plane 11 and wheels 15 also project forwardly of lower wings 12. Thus, through windows 51 and 52, the pilots are enabled at all times to fully observe the operation of the motors and the position of the landing wheels.

Reference numeral 53 denotes the windows of a passenger compartment to the rear of the pilot's compartment.

Reference numeral 54 denotes a frame disposed between seats 38 upon which are mounted the engine control levers M and T, control wheels 62 for the stabilizer adjustment, control post 68 with a swinging arm 63 at its upper end, whereby wheel 60 may be positioned in front of either of the seats, and various guide sheaves for the control cables.

A set of rudder control pedals is disposed in front of each seat, one set of these pedals being indicated at 55, Figure 8. These pedals may be of any appropriate design, but I have indicated a pedal of the improved type disclosed in my Patent No. 1,844,607, filed February 9, 1932.

The engines as disclosed herein are of the radial type and each is mounted on a ring as at 84, Figure 7, secured to the large end of a pyramidal frame 85. Ring 84 is secured to the front spar 86 of main plane 11 by means of suspension rods 87, 88, 89 and 91, while the rear end of frame 85 is secured to the front spar by means of rods 91 and 92. The rear end of the frame is secured to the rear spar 93 of the main frame by means of a rod 94. Since the supporting means for the motors are identical, reference characters have been applied only to the supporting frame for engine 70. The motors and their supports are provided with streamline housings as at 95, Figure 8, into which the outer ends of conduits 26b debouch. These latter conduits, it will be recalled, house the control connections to the motors and to the landing wheel controlling mechanism.

A frame 54', see Figures 9, 10 and 17, is mounted on the rear portion of frame 54 and supports a transverse shaft 96 on which are mounted the motor control levers M and T, which levers are respectively designed for the mixture and throttle adjustments. The upper ends of the levers are guided between segments as at 97, Figure 17, while their lower bifurcated ends engage blocks 98, Figure 19, pivoted by means of pins 99 to the slides 100. The forward ends of slides 100 are guided in bushings 101 fixed in a transverse support 102, while the rear ends of the slides have secured thereto flexible push and pull control rods or wires 103. Adjacent their extremities, rods 103 are passed through elbowed tubular guides 104 having flanged ends secured between clamps 105 and 106 which in turn are mounted on a cross member 107 secured to the opposite walls of frame 54'. Rods 103 are trained upwardly through conduit 26a and by means of further elbowed tubular guides, through conduits 26b and thence through further guides to control levers at the rear of the motors. The rods 103 which are in connection with control levers T are pivotally connected at their other end with levers 108, which through suitable mechanism are in connection with the engine throttle valves. The rods 103 which are in connection with levers M are in pivotal connection at their other ends with levers 109 which through suitable intermediate mechanism, control the mixture to the engine. Inasmuch as this invention has nothing to do with the throttle valves and mixture adjusting means per se, their description is not thought to be necessary. It will be understood that rods or wires 103 while being flexible, at the same time have sufficient rigidity not to buckle under compressive force.

Post 68, Figures 9 to 16, 20 and 24, is pivoted to suitable longitudinal members of frame 54 by means of trunnions 68'. At its lower end the post has secured thereto a pair of plates 110 extending above and below the trunnions and extending between them are cross bolts 111 and 112 to which the elevator controls 72, 73 and 75, 76 are secured. At the rear end of frame 54 two series of six sheaves each, are journaled on shafts 113 and 114 supported at their ends in suitable wall members, the shafts being vertically spaced. The sheaves of the lower series are numbered from 115 to 120. Cables 72 and 73 engage under sheaves 117 and 118, while cables 75 and 76 engage under sheaves 115 and 120 to be trained upwardly through conduits 26 and 26a to the main plane, whence, by means of suitable sheaves, not shown, they are trained rearwardly to post 74. The rudder control cables 77 and 78 engage under sheaves 116 and 119 and are thereby guided upwardly through conduits 26 and 26a and thence to the previously described cross arm for the rudder actuation.

The post 68, which is hollow, has secured to its upper end a pair of substantially triangular plates 121 and 122 to the upper portions and centrally of which is pivotally secured the lower end of the arm 63 by means of a bolt 123. Arm 63 carries a pin 124 adapted to cooperate with spring clips 125 to lock the arm in its limit positions which are determined by stop blocks 126 secured between plates 121 and 122. A flanged ball bearing supported guide roller is mounted on bolt 123 to the rear of the lower extremity of arm 63, in the planes of similar rollers 128 and 129' which are mounted on bolts 128' and 129'. Journaled in the distal end of arm 63 is a shaft 60' to which wheel 60 is fixed. At its rear end shaft 60' has secured thereto a sprocket wheel in the planes of rollers 127 to 129 and engaged therewith is a length of sprocket chain 130. Mounted in post 68 on a transverse bolt 131 are a pair of rollers 132 and 133. Secured to the lower ends of sprocket chain 130 are chain sections as at 134 adapted to flex in planes transverse to the axis of bolt 131, these in turn being secured to aileron control cables 135 and 136.

Due to the described arrangement, it will be apparent that in all the angular positions of arm 63 relative to the post 68 the tension of chains 130, 134 and cables 135 and 136 is not altered. Chain 131 lies to the rear of post 63 and may be enclosed by means of a cover 137 secured to the latter. A cap 138 may also enclose the rear end of shaft 60'.

The series of sheaves mounted on shaft 113 has its units numbered from 139 to 144. As in ordinary practice, cables 135 and 136 each have two control cables connected thereto, these being designated as 145, 146, 147 and 148 and shown as engaging under sheaves 139, 140, 143 and 144 respectively, whereby they are guided upwardly through conduits 26 and 26a from whence they are guided into suitable connection with the ailerons.

Journaled in suitable side walls 54a and 54b of frame 54 is a shaft 149 to the projecting ends of which wheels 62 are secured.

Centrally, the shaft has fixed thereto a drum 150 having a spirally grooved periphery about which cable sections 79 and 80 for the stabilizer controls are wound, these sections being guided by means of sheaves 141 and 142 respectively.

From the above it will be seen that I have provided a multimotor amphibian possessing numerous novel features, these features relating specifically to the means for localizing all the controls at a point accessible to either of a plurality of pilots.

It will be understood that although I have described one embodiment of my invention with some particularity, I do not confine myself to this specific disclosure, the scope of the invention being determined in the following claims.

I claim:

1. In a multimotor amphibian, the combination comprising a wing or supporting surface, a body boat structure beneath and connected to said supporting surface, a pilot's compartment in the forward portion of said body boat and extending ahead of the wing, retractible landing gear operated by fluid hingedly mounted on said body boat, a plurality of power plants attached to said wing driving tractor propellers, control means in said pilot's compartment for controlling said power plants, and further control means in said pilot's compartment for controlling by fluid moving through connecting conduits the position of said retractible landing gear above or below the bottom of said body boat structure.

2. In a multimotor amphibian, the combination comprising a wing or supporting surface, a body boat structure beneath and connected to said supporting surface, motors connected to said supporting surface, said motors driving tractor propellers rotating in front of said supporting surface, a pilot's compartment in said body boat forward of said wing, hydraulic telescopic retractible landing gear hingedly mounted on said body boat structure adjacent said pilot's compartment, motor controls in said pilot's compartment, hydraulic landing gear controls located in said compartment and connected to said landing gear and windows in said pilot's compartment through which the rotation of the propellers and the height of said landing gear can be observed by an occupant of said pilot's compartment, said motor controls and landing gear controls being positioned within said pilot's compartment and within the grasp of said occupant.

3. In a multimotor amphibian, the combination comprising a body boat structure, a wing or supporting surface extending above and across said body boat structure and connected thereto, two motors mounted adjacent said wing, one motor being supported on each side of the longitudinal center line of the amphibian so as to have its weight carried in part directly by said body boat structure, fluid pressure actuated folding retractible landing gear mounted on each side of said body boat structure in such a manner as to receive directly when it is in its lowered position the weights of both of said motors when the amphibian is landing on land.

4. In a multimotor amphibian, the combination comprising a wing or supporting surface, a boat structure mounted below and connected to said wing, motors mounted adjacent said supporting surface and positioned on each side of the longitudinal center line of said boat structure, a pilot's compartment, control mechanism in said pilot's compartment, control means connecting said motors and control mechanism, and hydraulic retractible landing gear hingedly mounted on said boat structure, hydraulic landing gear controls in said pilot's compartment and pipes connecting said landing gear and landing gear controls.

5. In a multimotor amphibian, the combination comprising a wing or supporting surface, a body boat structure beneath and connected to said supporting surface, a pilot's compartment in the forward portion of said body boat and extending ahead of the wing, fluid pressure actuated retractible landing gear hingedly mounted on said body boat, a plurality of power plants attached to said wing, said power plants driving tractor propellers, control mechanism in said pilot's compartment for controlling said power plants, individual control means connecting said power plant control mechanisms and said power plants, and fluid pressure control means in said pilot's compartment for controlling the position of said retractible landing gear, said landing gear control means connected to said fluid pressure actuated retractible landing gear.

6. In a multimotor amphibian, the combination comprising a wing or supporting surface, a body boat structure beneath and associated with said supporting surface and driving tractor propellers rotating in front of said supporting surface, a pilot's compartment in said body boat forward of said wing, individual control means for said motors leading from the motors to said pilot's compartment, retractible landing gear hingedly mounted on said body boat structure adjacent said pilot's compartment, fluid pressure controls in said pilot's compartment and operatively connected to said landing gear, and windows in said pilot's compartment through which the rotation of the propellers and the height of said landing gear can be observed by an occupant of said pilot's compartment.

7. In an amphibian, the combination comprising a boat, a wing or supporting surface extending above and across said boat and connected thereto, a motor between said wing and said boat and connected to said wing, retractable landing gear mounted on said wing and hingedly connected to said boat.

8. In an amphibian, the combination comprising a boat, a wing or supporting surface extending above and across said boat and connected thereto, a motor means for supporting said motor on said wing forward of the leading edge, said means consisting of members between said motor and said wing, and retractable landing gear hingedly mounted on said boat and on said wing above said boat.

9. In a multimotor amphibian, the combination comprising a boat structure, a wing or supporting surface extending above and across said boat structure and connected thereto, two motors supported by said wing by means entirely between the respective motors and the wing, one motor being supported on each side of the longitudinal center line of the amphibian, retractable landing gear hingedly mounted on each side of said boat and directly hingedly connected to said wing in such a manner as to receive directly the weights of both of said motors when the amphibian is landing on land.

10. In a multimotor amphibian, the combination comprising a boat structure, a wing or supporting surface connected to said boat, two motors supported by said wing all the members for directly supporting the motor extending between the motor and the wing, one motor being supported on each side of the longitudinal center line of the amphibian, retractable landing gear hingedly mounted on each side of said boat in such a manner as to receive directly the weights of both of said motors when the amphibian is landing on land.

11. In an amphibian, a combination comprising a wing or supporting surface, a boat structure beneath and connected to said supporting surface, a motor supported by said supporting surface, said motor driving a propeller, a completely inclosed pilot's compartment in said boat, retractable landing gear mounted on said boat structure adjacent said pilot's compartment, motor controls and landing gear controls in said pilot's compartment, said landing gear and said propeller being visible from said pilot's compartment.

12. In a land-water-air type of aircraft, a body boat structure including a pilot's compartment in the forward portion of said body boat structure, wing surfaces attached to said body boat structure, a telescopic hydraulic retractable landing gear fastened to said body boat and to one of said wing surfaces, said landing gear also positioned forward of another one of said wing surfaces but adjacent to said latter wing surface, a hydraulic pump within said pilot's compartment, conduit means connecting said pump to said telescopic hydraulic retractable landing gear and means for actuating said pump in said compartment to raise and lower said retractable landing gear hydraulically and telescopically.

Signed at College Point, Long Island, in the county of Queens and State of New York this 27th day of March A. D. 1929.

IGOR SIKORSKY.